(12) United States Patent
Espina et al.

(10) Patent No.: US 7,188,895 B1
(45) Date of Patent: Mar. 13, 2007

(54) PREFORMED FOAM SEATBACK WITH INTEGRAL OPENING

(75) Inventors: Roel C. Espina, Redlands, CA (US); Eugene M. Tuccinardi, Temecula, CA (US)

(73) Assignee: Timely Innovations, LP, Temecula, CA (US)

( * ) Notice: Subject to any disclaimer, the term of this patent is extended or adjusted under 35 U.S.C. 154(b) by 280 days.

(21) Appl. No.: 10/765,464

(22) Filed: Jan. 26, 2004

Related U.S. Application Data

(60) Provisional application No. 60/442,803, filed on Jan. 24, 2003.

(51) Int. Cl.
*A47C 7/62* (2006.01)

(52) U.S. Cl. .............................. 297/217.3; 297/188.04

(58) Field of Classification Search ........... 297/188.04, 297/188.07, 217.3, 217.6
See application file for complete search history.

(56) References Cited

U.S. PATENT DOCUMENTS

| | | | |
|---|---|---|---|
| 3,615,118 A * | 10/1971 | Buxton | 297/188.07 |
| 4,584,603 A | 4/1986 | Harrison | |
| 4,647,980 A | 3/1987 | Steventon et al. | |
| 4,726,621 A * | 2/1988 | Muller | 297/146 |
| 4,756,528 A | 7/1988 | Umashankar | |
| 4,647,980 A | 6/1989 | Steventon et al. | |
| RE33,423 E * | 11/1990 | Lobanoff | 297/188.06 |
| 5,267,775 A | 12/1993 | Nguyen | |
| 5,292,174 A | 3/1994 | Ohnuma | |
| 5,295,732 A * | 3/1994 | Boisset | 297/452.1 |
| 5,359,349 A | 10/1994 | Jambor et al. | |
| 5,507,556 A | 4/1996 | Dixon | |
| 5,529,265 A | 6/1996 | Sakurai | |
| 5,555,466 A | 9/1996 | Scribner et al. | |
| 5,713,633 A | 2/1998 | Lu | |
| 6,199,948 B1 | 3/2001 | Bush et al. | |
| 6,250,967 B1 | 6/2001 | Chu | |
| 6,871,356 B2 * | 3/2005 | Hashimoto | 348/837 |
| 6,986,190 B2 * | 1/2006 | Jost | 297/188.07 |
| 7,040,697 B1 * | 5/2006 | Tuccinardi et al. | 297/217.3 |

* cited by examiner

*Primary Examiner*—Peter R. Brown
(74) *Attorney, Agent, or Firm*—Knobbe Martens Olson & Bear LLP (57) ABSTRACT

A high-back automobile seat having an opening defined by the seat's rear surface. The opening allows mounting of utility or entertainment components for use by a passenger behind the high-back seat. Entertainment components such as a video screen or an integrated DVD player/screen may be mounted for viewing enjoyment. A formed seat bun with the opening provides the space for mounting of such components. The formed seat bun may be prewired to allow easier installation of electronic components. An area about the opening may be contoured to provide sufficient depth for flush mounting of components.

28 Claims, 13 Drawing Sheets

PREFORMED FOAM SEATBACK WITH INTEGRAL OPENING

RELATED APPLICATION

This application claims the benefit of U.S. provisional application 60/442,803 filed Jan. 24, 2003 entitled "PREFORMED FOAM SEATBACK WITH INTEGRAL OPENING" which is incorporated herein in its entirety by reference.

BACKGROUND

1. Field

The present teachings relates to automobile seats in general and in particular, relates to a preformed foam seatback with an integral opening for utility purposes.

2. Description of the Related Art

With the recent advances in video display technology, relatively thin, compact, and power efficient video screens are frequently being incorporated into automobiles. Such video screens allow rear seat passengers to enjoy watching a video program.

Conventional video screens are either mounted on the ceiling or to a removable headrest. The ceiling mounted video screens usually fold down for viewing, and fold up to a generally horizontal orientation for storage. The rear portion of the headrest also provides a convenient location for placing the video screen, and the removability of headrests provides modularity that facilitates mounting of the video screen thereon. In many applications, the modularity allows the existing headrest to be replaced with one having a video screen already built in.

Some vehicles, however, have a single-piece back rest that does not have a headrest. Instead, such back rest extends to a height similar to that of the headrest. These seats are commonly called high-back seats or bucket seats. Because such single-piece seats do not have a removable portion suitable for modular mounting, installing video screens and other entertainment or utility components on the rear portion of the seat can be more challenging.

SUMMARY

One aspect of the present teachings relates to a preformed foam bun for an automobile high-back seat. The foam bun comprises a front portion that provides cushion and shape of the front portion of the high-back seat. The foam bun further comprises a rear portion joined to the front portion so as to define an interior space for receiving an internal frame of the high-back seat. The rear portion defines an opening dimensioned to receive a utility or an entertainment component therein.

In one embodiment, the foam bun further comprises a mound about the opening such that the mound increases the depth of the opening. The increased depth allows flush mounting of the utility or the entertainment component with respect to the mound. In one embodiment, the front portion of the foam bun is contoured with respect to the mound so as to generally maintain a desired thickness of the foam bun about the opening.

In one embodiment, the foam bun further comprises a wire pathway defined by the foam bun. The pathway allows one or more wires to be routed from a first location adjacent the opening to a second location on the foam bun thereby allowing the foam bun to be prewired for easier wiring of the utility or the entertainment component installed in the opening.

In one embodiment, the foam bun is formed from urethane. The opening is formed during molding of the foam bun.

In one embodiment, the utility component comprises a storage compartment. In one embodiment, the storage compartment includes a cover. In one embodiment, the entertainment component includes a video screen. In one embodiment, the entertainment compartment includes a cover to hide the video screen from view when the video screen is not in use.

Another aspect of the present teachings relates to a high-back seat for an automobile. The seat comprises an internal frame that provides structural integrity of the seat. The seat further comprises a seat cover that covers the seat. The seat further comprises a preformed bun interposed between the internal frame and the seat cover. The bun defines an opening at its rear portion such that the opening allows installation of a utility or an entertainment component therein.

In one embodiment, the bun is contoured about the opening so as to provide sufficient depth for flush mounting of the utility or the entertainment component. In one embodiment, the contouring of the bun comprises a mound at the rear portion of the bun about the opening. In one embodiment, the contouring of the bun further comprises a reduction in the front portion of the bun about the opening to generally maintain a desired thickness of the bun about the opening.

In one embodiment, the bun further defines a wire pathway that allows one or more wires to be routed from a first location adjacent the opening to a second location on the bun. The pathway allows the bun to be prewired for easier wiring of the utility or the entertainment component installed in the opening.

In one embodiment, the bun is formed from urethane foam. In one embodiment, the opening is formed during molding of the foam bun.

In one embodiment, the utility component comprises a storage compartment. In one embodiment, the storage compartment includes a cover. In one embodiment, the entertainment component includes a video screen. In one embodiment, the entertainment compartment includes a cover to hide the video screen from view when the video screen is not in use.

Yet another aspect of the present teachings relates to a foam bun for an automobile high-back seat. The foam bun comprises a front portion that provides cushion and shape of the front portion of the high-back seat. The foam bun further comprises a rear portion joined to the front portion so as to define an interior space for receiving an internal frame of the high-back seat. The foam bun further comprises an opening defined by the rear portion of the seat. The opening allows installation of a utility or an entertainment component therein. The foam bun further comprises a mound formed about the opening to increase the depth of the opening.

Yet another aspect of the present teachings relates to a preformed foam bun for an automobile high-back seat. The foam bun comprises a front portion that provides cushion and shape of the front portion of the high-back seat. The foam bun further comprises a rear portion joined to the front portion so as to define an interior space for receiving an internal frame of the high-back seat. The foam bun further comprises an opening defined by the rear portion of the seat. The opening allows installation of a utility or an entertainment component therein. The foam bun further comprises a wire pathway defined by the foam bun such that the pathway allows one or more wires to be routed from a first location adjacent the opening to a second location on the foam bun. The pathway allows the foam bun to be prewired for easier wiring of the utility or the entertainment component installed in the opening.

Yet another aspect of the present teachings relates to a method of fabricating a foam bun for an automobile high-back seat. The method comprises forming a mold that results in a rear portion of the foam bun having an opening for receiving a utility or an entertainment component. The method further comprises introducing a foaming agent into the mold. The method further comprises allowing the foaming agent to form a positive impression of the mold. The method further comprises removing the mold to yield a formed foam bun.

Yet another aspect of the present teachings relates to a method of increasing the depth of an opening defined by a rear portion of a foam bun for an automobile high-back seat. The method comprises exposing the foam bun, and forming a mound about the opening such that the mound extends the depth of the opening.

Yet another aspect of the present teachings relates to a method of installing a utility or an entertainment component to the rear portion of an automobile high-back seat. The method comprises removing a seat cover to expose a foam bun of the seat. The method further comprises forming an opening at the rear portion of the seat. The method further comprises forming a mound about the opening such that the mound extends the depth of the opening. The method further comprises installing the utility or the entertainment component within the opening having the extended depth such that the utility or the entertainment component flush mounts with respect to the mound.

BRIEF DESCRIPTION OF THE DRAWINGS

FIGS. 9A and B illustrate an integrated DVD player/video screen unit mounted in the opening of one embodiment of the bun;

DETAILED DESCRIPTION OF SOME EMBODIMENTS

These and other aspects, advantages, and novel features of the present teachings will become apparent upon reading the following detailed description and upon reference to the accompanying drawings. In the drawings, similar elements have similar reference numerals.

Figure 1A:
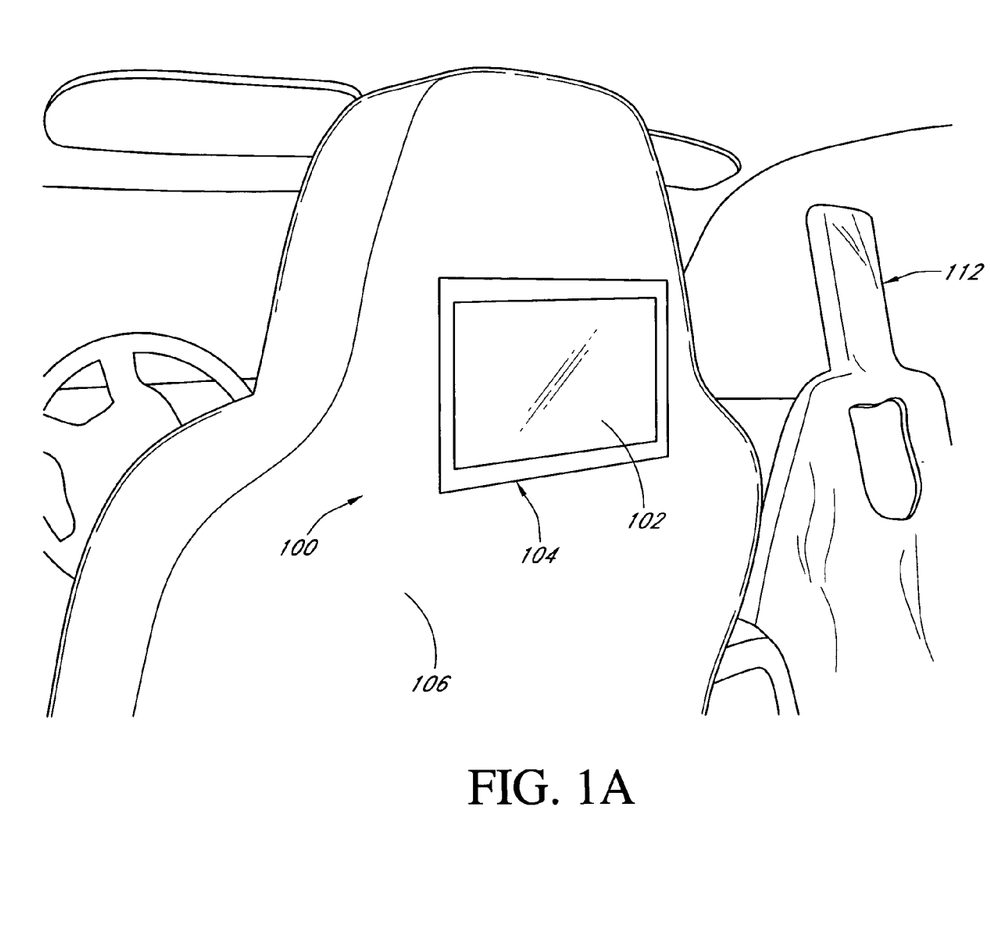
FIG. 1A illustrates a high-back automobile seatback having a video screen mounted on its rear portion.
Figure 1B:
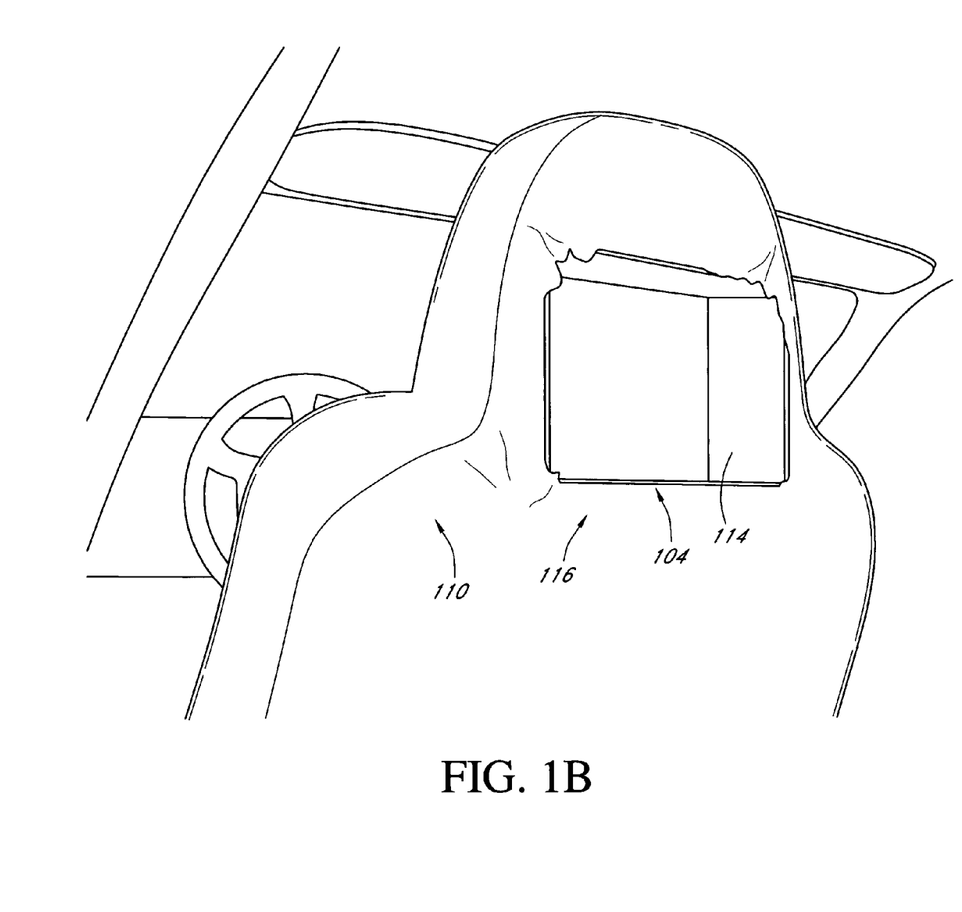
FIG. 1B illustrates the seat of FIG. 1A with its cover removed, showing a foam bun that provides shape and cushion for the seatback.

FIGS. 1A and B illustrate an exemplary high-back seat 100, also referred to as a bucket seat. For the purpose of description herein, "high-back seat" and "bucket seat" may be used interchangeably; and sometimes may simply be referred to as "seat."

The seat 100 may comprise a bun 110 that fits over an internal frame 112. The bun 110 is covered with a seat cover 106. The internal frame 112 provides the structural support for the seat 100. The bun 110 can be formed from a foam material having desired properties for providing shape and cushioning of the seat 100. The seat cover 106 may comprise a leather or a fabric upholstery to provided a desired appearance and texture.

One aspect of the present teachings relates to the bun 110 of the high-back seat 100 having an opening 104 defined at the rear portion of the bun 110. Such an opening facilitates mounting of components such as a video monitor 102. As shown in FIG. 1B, the exemplary video monitor 102 may be mounted via a mounting bucket 114. As described below, the video monitor can be mounted in a variety of ways. Furthermore, other utility components may be mounted within the opening 104. Still furthermore, the opening 104 may be plugged with a removable plug if one does not wish to have any component mounted to the rear or the seat 100.

Another aspect of the present teachings relates to the bun 110 of the high-back seat being contoured about an area 116 about the opening 104 to allow sufficient depth of the opening 104 to allow flush mounting of a component. A flush mounted component, such as the exemplary monitor 102 in FIG. 1A, provides functional advantages as well as aesthetically pleasing appearance.

Figure 2A:
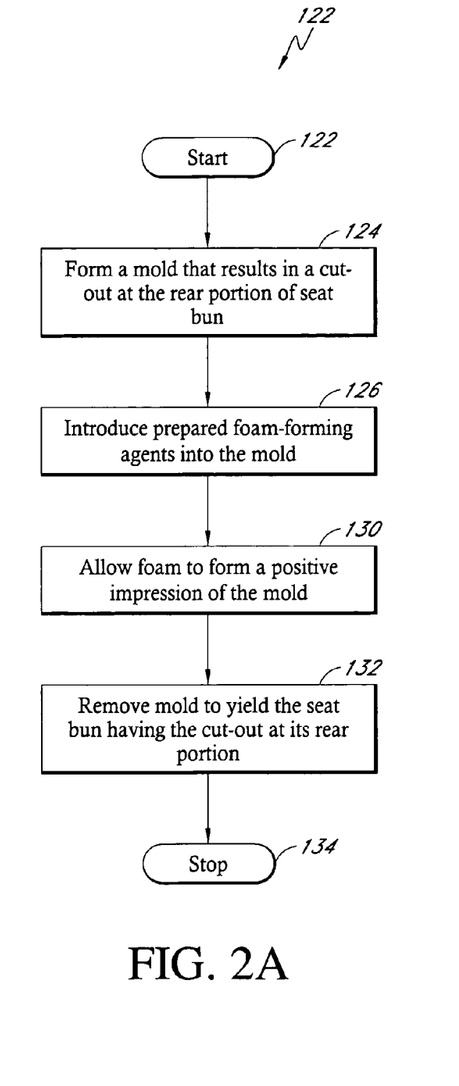
FIGS. 2A and B illustrate two methods of fabricating a seatback foam bun having an opening that allows mounting of the video screen or other components therein.

FIGS. 2A and B illustrates two possible processes for fabricating a high-back seat bun having an opening at its rear portion. One process 120, as shown in FIG. 2A, may be performed by an original equipment manufacturer (OEM) of the seat bun. In one implementation, the bun fabricating process 120 begins at a start state 122. In step 124 that follows, the process 120 forms a mold that results in a cut-out at the rear portion of the seat bun. In step 126 that follows, the process 120 introduces prepared foam-forming agents into the mold. In one implementation, the resulting foam comprises a urethane foam. In step 130 that follows, the process 120 allows the foam to expand in the mold and form a positive impression of the mold. In step 132 that follows, the process 120 removes the mold to yield the molded seat bun having the cut-out (opening) at its rear portion. The process 120 ends at a stop state 134. The foregoing OEM process 120 yields a clean and well defined opening, particularly in foam buns.

Figure 2B:
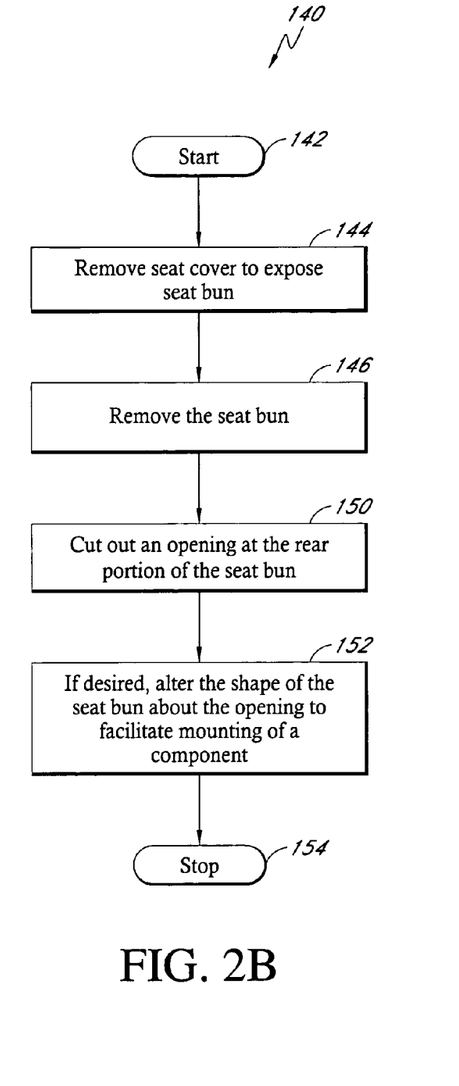

Another process 140, as shown in FIG. 2B, may be performed by an aftermarket installer to form the opening at the rear portion of an existing seat bun. In one implementation, the process 140 begins at a start state 142. In step 144 that follows, the process 140 removes the seat cover from the seat to expose the seat bun. In step 146 that follows, the process 140 removes the seat, bun. In step 150 that follows, the process 140 cuts out an opening at the rear portion of the seat bun. In step 152 that follows, the process 140, if desired, alters the shape of the seat bun about the opening to facilitate mounting of a component. The process 140 ends at a stop state 154. In one implementation, step 146 of removing the seat bun may be omitted, and the cutting out the opening may be performed while the bun is still in place.

Figure 3A:
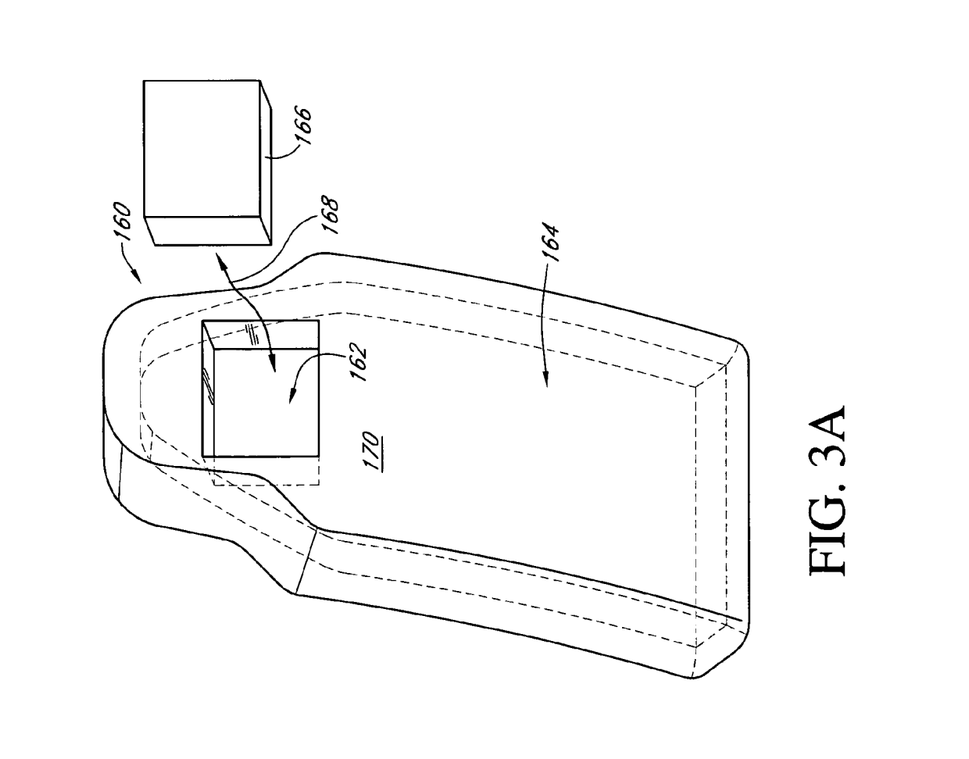
FIGS. 3A and B illustrate perspective and side views of one embodiment of the bun whose rear portion defines an opening and wherein the opening can be plugged with a foam plug if the opening is not used for mounting a component therein.

FIGS. 3A and B now illustrate perspective and side views of an exemplary bun 160 with an opening 162 defined by the rear portion 170 of the bun 160. The opening 162 may be formed by either of the processes 120, 140 described above in reference to FIGS. 2A and B. In one embodiment, the bun 160 defines an interior space 164 for receiving the internal frame (not shown).

Figure 3B:
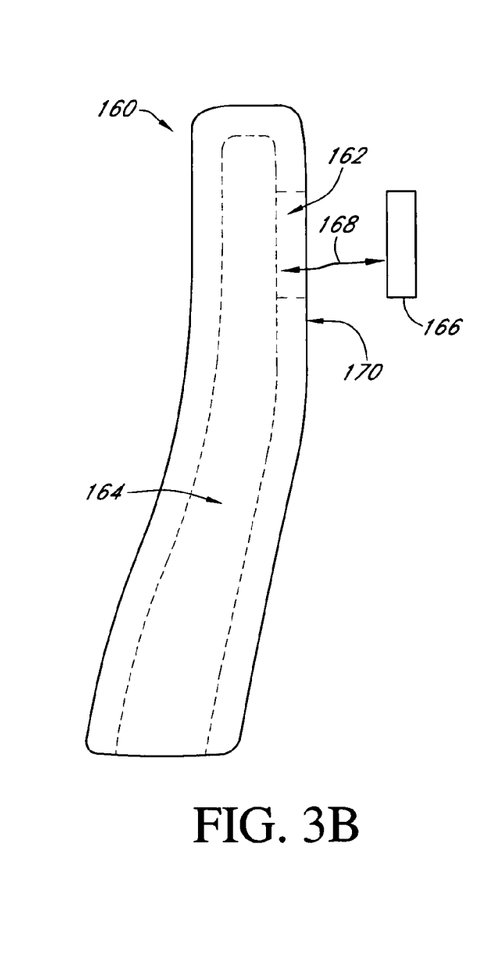

FIGS. 3A and B further illustrate that a plug 166 may be placed in the opening 162, or removed therefrom (as depicted by arrow 168). With the plug 166 removed, the opening 162 can receive various component, some of which are described below. When no component is to be installed in the opening 162, the plug 166 can fill the space defined by the opening 162 so as to not have a void underneath a seat cover (not shown).

Figure 4A:
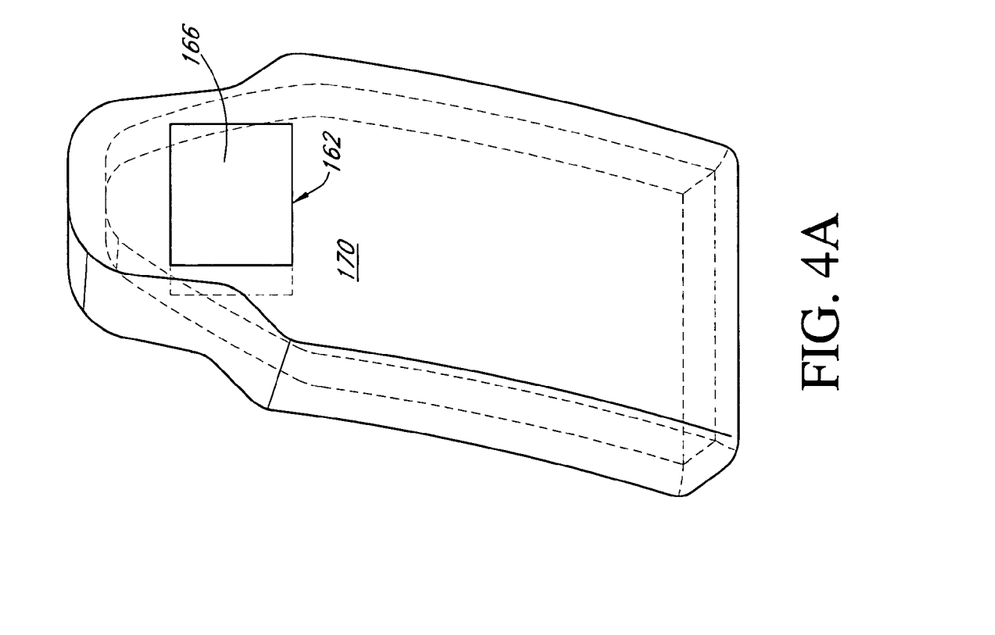
FIGS. 4A and B illustrate the bun of FIGS. 3A and B with the opening plugged with the foam plug.
Figure 4B:
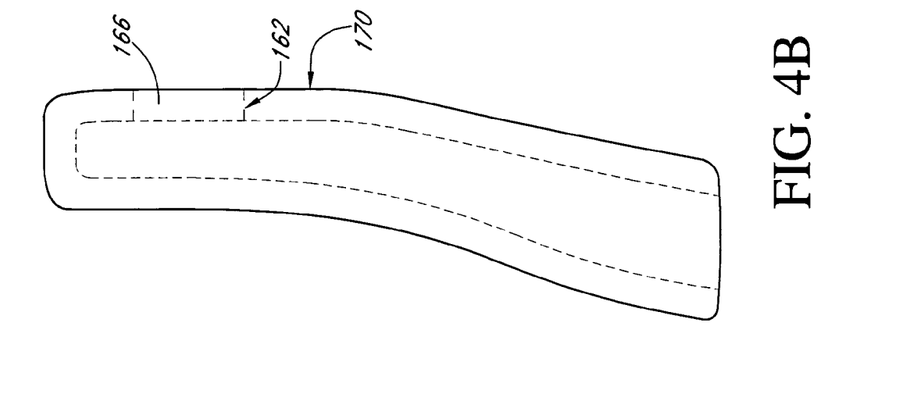

FIGS. 4A and B illustrate a configuration where the plug 166 is in the opening 162. In one embodiment, the plug 166 is formed from similar material (foam, for example) as the bun, and is dimensioned so as to allow removable friction fit and a contour that generally conforms to the rear portion 170 of the bun. When the seat cover is placed over such a bun, the rear portion of the seat then appears as if there is no void underneath.

Figure 5A:
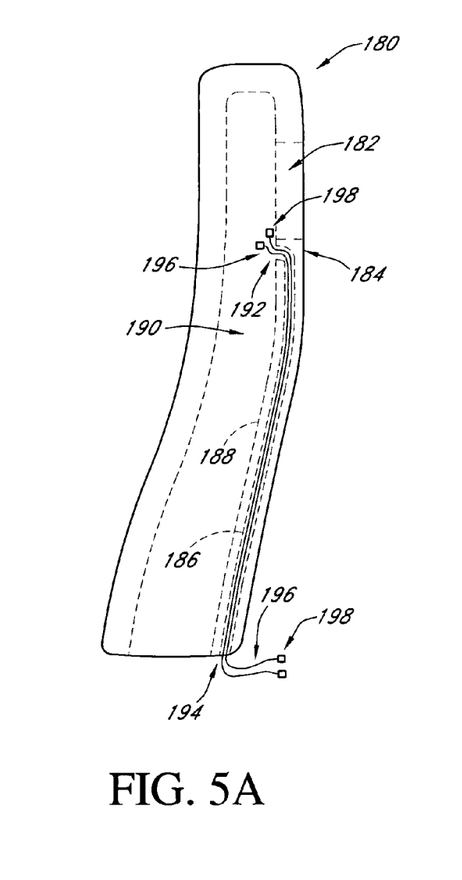
FIGS. 5A and B illustrate one embodiment of the bun having a cable pathway that allows the bun to be prewired.
Figure 5B:
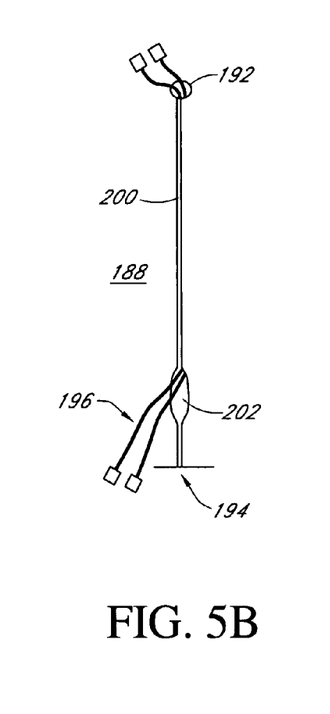

One aspect of the present teachings relates to a prewired bun having one or more wires routed to an area adjacent an opening defined by the rear portion of the bun. FIGS. 5A and B illustrate an exemplary bun 180 having an opening 182 defined by the rear portion 184 of the bun 180. The bun 180 defines an interior space 190 that receives the internal frame (not shown). In one embodiment, the wires 196 are routed through a pathway 186 formed adjacent a first surface 188 of the interior space 190. The exemplary routing shown in FIGS. 5A and B route the wires 196 from an area adjacent the bottom of the bun to an area adjacent the opening 182. The wires 196 are retained within the pathway 186, and the ends of the wires 196 emerge from pathway ends 192 and 194.

The wires 196 may provide power and signal to and/or from a component mounted in the opening 182. The exemplary wires 196 are depicted as being terminated with connectors 198. It will be understood, however, that the wires 196 do not necessarily need to have the connectors installed.

FIG. 5B illustrates one embodiment of the pathway 186 formed adjacent the interior surface 188. The pathway 186 may be dimensioned (for example, similar to the opening 192 in FIG. 5B) to receive the wires 196 therein. The pathway 186 and the interior surface 188 may be connected by a relatively narrow slit 200 having a width dimension that inhibits the wires 196 from easily passing therethrough, thereby retaining the wires 196 within the pathway 186.

As shown in FIG. 5B, the wires 196 are in a nearly completed stage of being installed into the pathway 186. The wires 196 can be installed by slightly spreading the slit 200 (as depicted by an enlarged slit portion 202) and pushing in the wires 196 into the pathway 186.

In one embodiment, the pathway 186 and the slit 200 are formed during fabrication (by molding, for example). In another embodiment, the similar wire routing "pathway" may be formed by a simple slit cut into the interior surface 188. Bun materials such as foam can yield to the wires pushed therein, and the wires can deform the surrounding foam and thereby be retained.

FIGS. 6–9 now illustrate various components that can be installed within the opening defined by the rear portion of the bun. It will be appreciated that these components and the manner in which they are mounted are exemplary, and should not be construed to limit the scope of the present teachings.

Figure 6A:
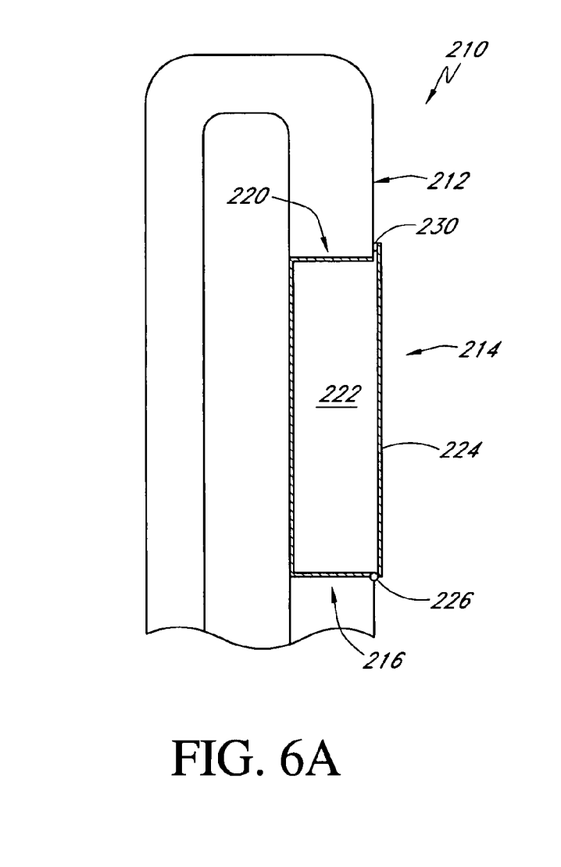
FIGS. 6A and B illustrate a storage compartment mounted in the opening of one embodiment of the bun.
Figure 6B:
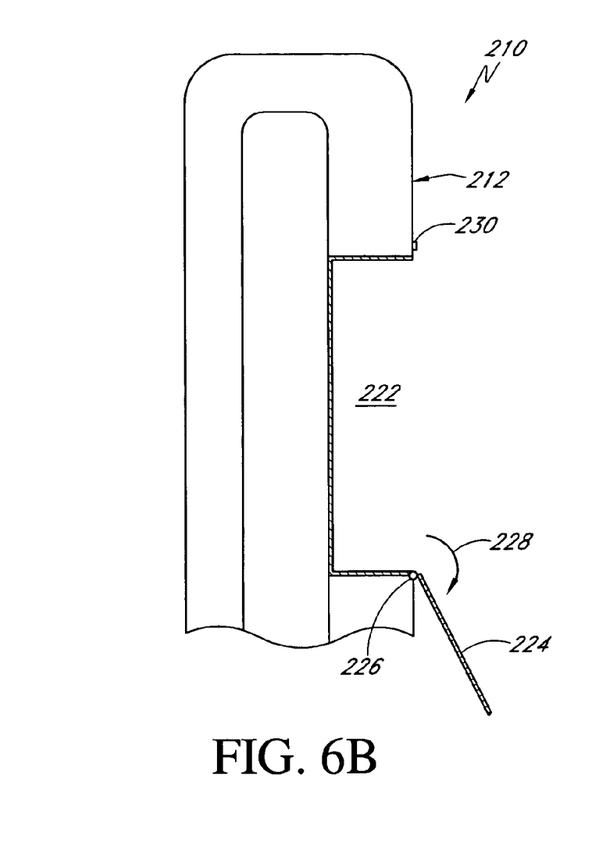

FIGS. 6A and B illustrate a utility compartment 214 mounted in an opening 216 defined by the rear portion 212 of a seat 210. In one embodiment, the utility compartment 214 comprises a housing 220 that defines a compartment space 222. The space 222 may be enclosed by a cover 224 that can be hingeably mounted about a hinge 226. FIG. 6A shows the cover 224 in a closed configuration, with a portion of the cover 224 latched by a latching component 230. FIG. 6B shows the cover 224 in an open configuration (as shown by arrow 228), thereby allowing access to the space 222. It will be appreciated that the cover and its mounting and latching methods described herein are exemplary and in no way intended to limit the scope of the present teachings.

Figure 7A:
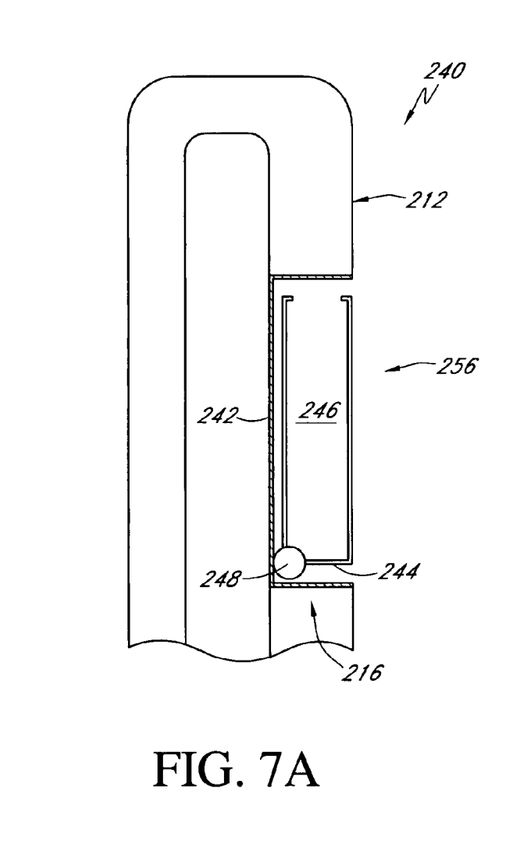
FIGS. 7A and B illustrate another storage compartment mounted in the opening of one embodiment of the bun.
Figure 7B:
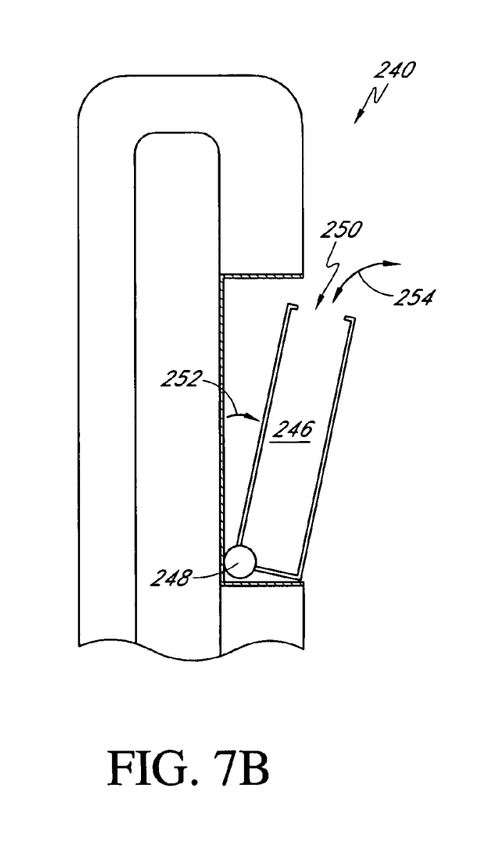

FIGS. 7A and B illustrate another embodiment of a seat 240 having a utility compartment 256 comprising an inner shell 246 hingeably mounted to a housing 242 via a hinge 248. The inner shell 244 defines a compartment space 246 that is accessible via an opening 250 when the inner shell 244 is in an "open" configuration (FIG. 7B, arrow 252). Removal and insertion of objects from and to the compartment space 246 is depicted by arrow 254.

The exemplary utility compartments described above in reference to FIGS. 6 and 7 can be adapted and used in a variety of ways. Such uses can include, but are not limited to, storage of items such as sunglasses, tissue boxes, CDs, DVDs, and the like.

Figure 8A:
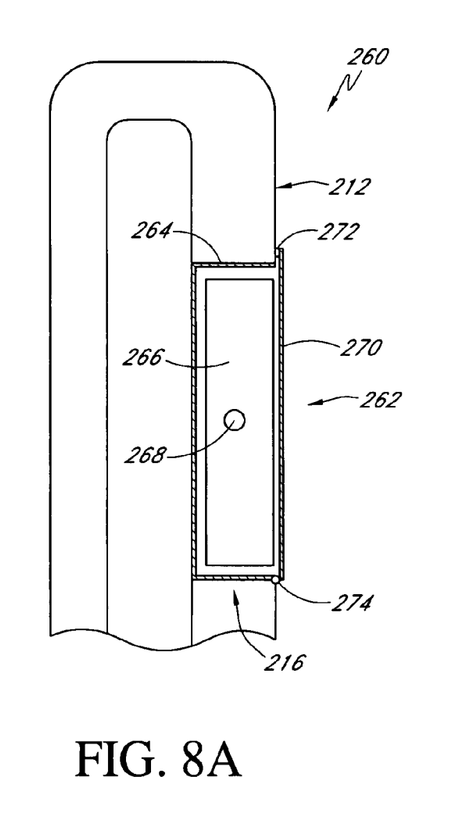
FIGS. 8A and B illustrate a video screen mounted in the opening of one embodiment of the bun.
Figure 8B:
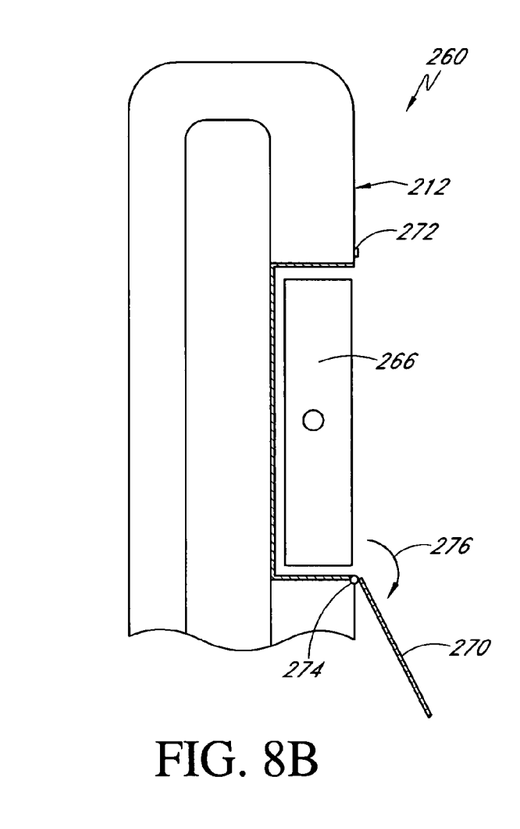

FIGS. 8A and B illustrate another embodiment of a seat 260 having an exemplary video component 262 mounted in the opening 216 of the rear portion 212. In one embodiment, the video component 262 comprises a video screen 266 mounted to a bucket 264. The mounting of the video screen 266 to the bucket 264 may be via a hinge assembly 268 so as to allow the video screen 266 to tilt up or down thereby allowing a suitable viewing angle. Such mounting technique is further described in a copending U.S. patent application Ser. No. 10/395,870 titled "Headrest Having an Integrated Video Screen" filed Mar. 20, 2003 which is hereby incorporated by reference in its entirety.

In one embodiment, the video component 262 further comprises a cover 270 that hides the video screen 266 from view, thereby reducing the exposure of a relatively expensive screen to a potential thief. The exemplary cover 270 may be mounted on a hinge 274 and be retained in its closed configuration by a latching mechanism 272. As shown in FIG. 8B, the cover 270 may swing downward (arrow 276) about the hinge 274 to expose the video screen 266 for viewing.

Figures 9A, 9B:
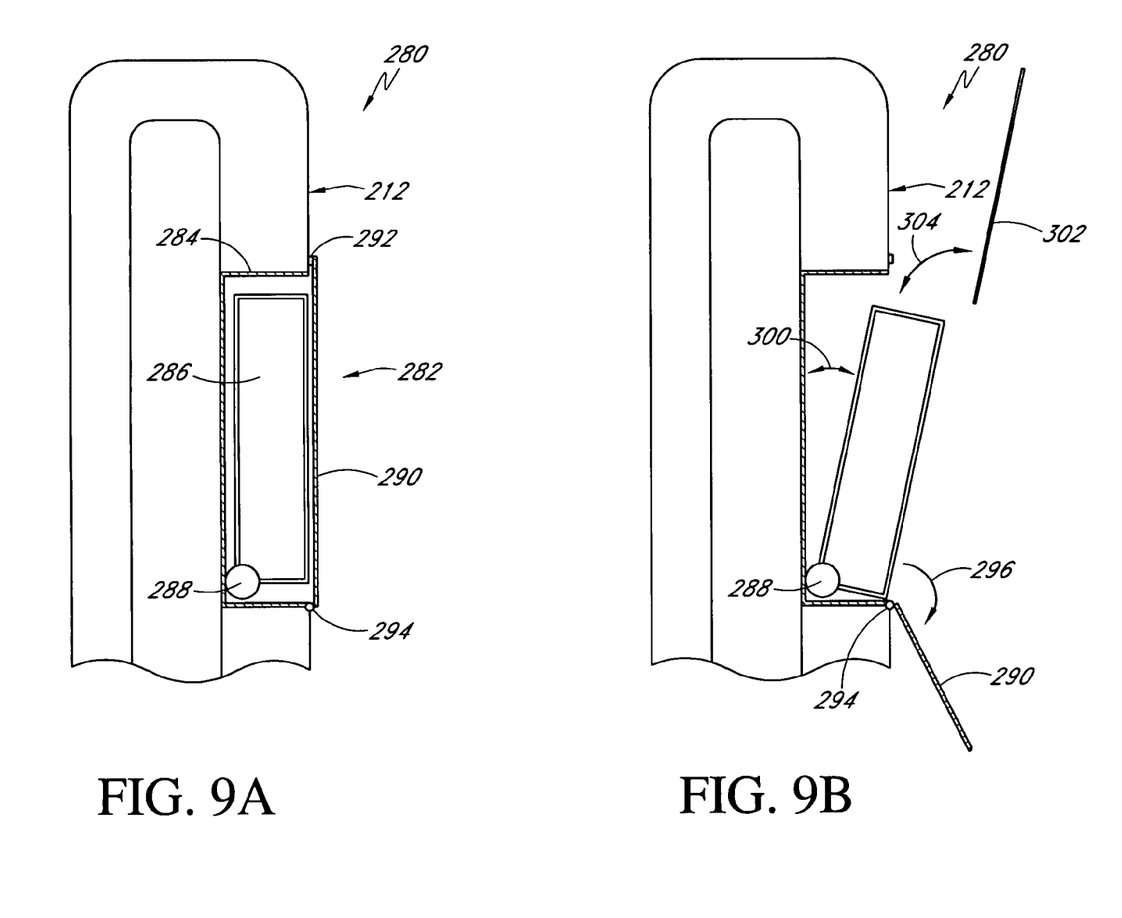

FIGS. 9A and B illustrate one embodiment of a seat 280 having another embodiment of a video component 282 mounted in the opening of the rear portion 212. The video component 282 comprises an integrated DVD player/screen 286 mounted to a mounting bucket 284. The integrated component 286 may be mounted to the bucket 284 by a hinge 288 disposed adjacent the bottom portion of the component 286 and the bucket 284. Such a hinge mounting allows the integrated component 286 to tilt outward (arrow 300) to allow a disk 302 to be inserted to or removed from (arrow 304) the integrated component 286. In one embodiment, the integrated component 282 further comprises a cover 290 that hides the integrated component 286 from view. The exemplary cover 290 may be mounted on a hinge 294 and be retained in its closed configuration by a latching mechanism 292. As shown in FIG. 9B, the cover 290 may swing downward (arrow 296) about the hinge 294 to expose the integrated component 286 for use.

Figure 10:
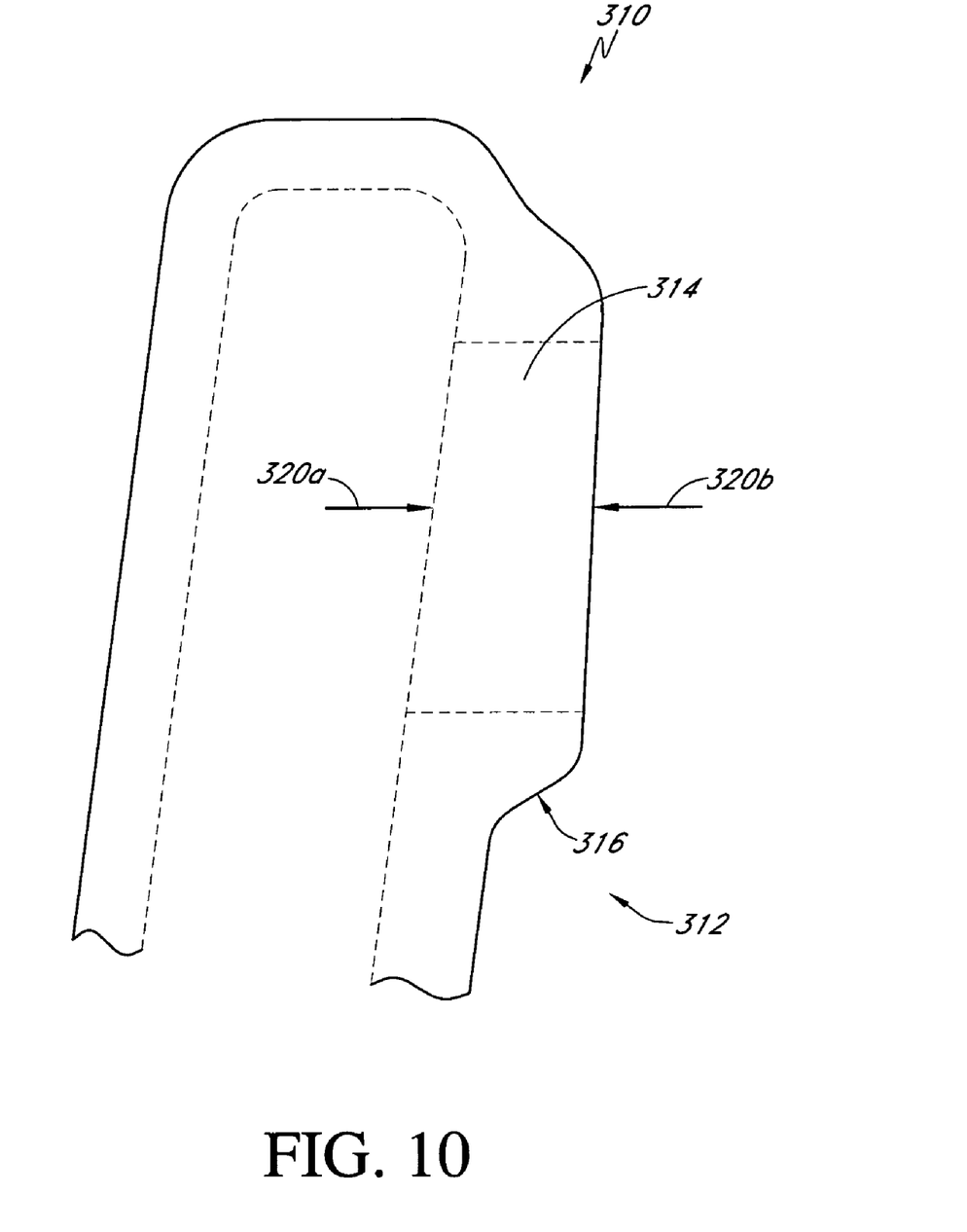
FIG. 10 illustrates one embodiment of the bun having a mound built about the opening so as to provide sufficient opening depth thereby allowing flush fitting of some components in the opening.
Figure 11:
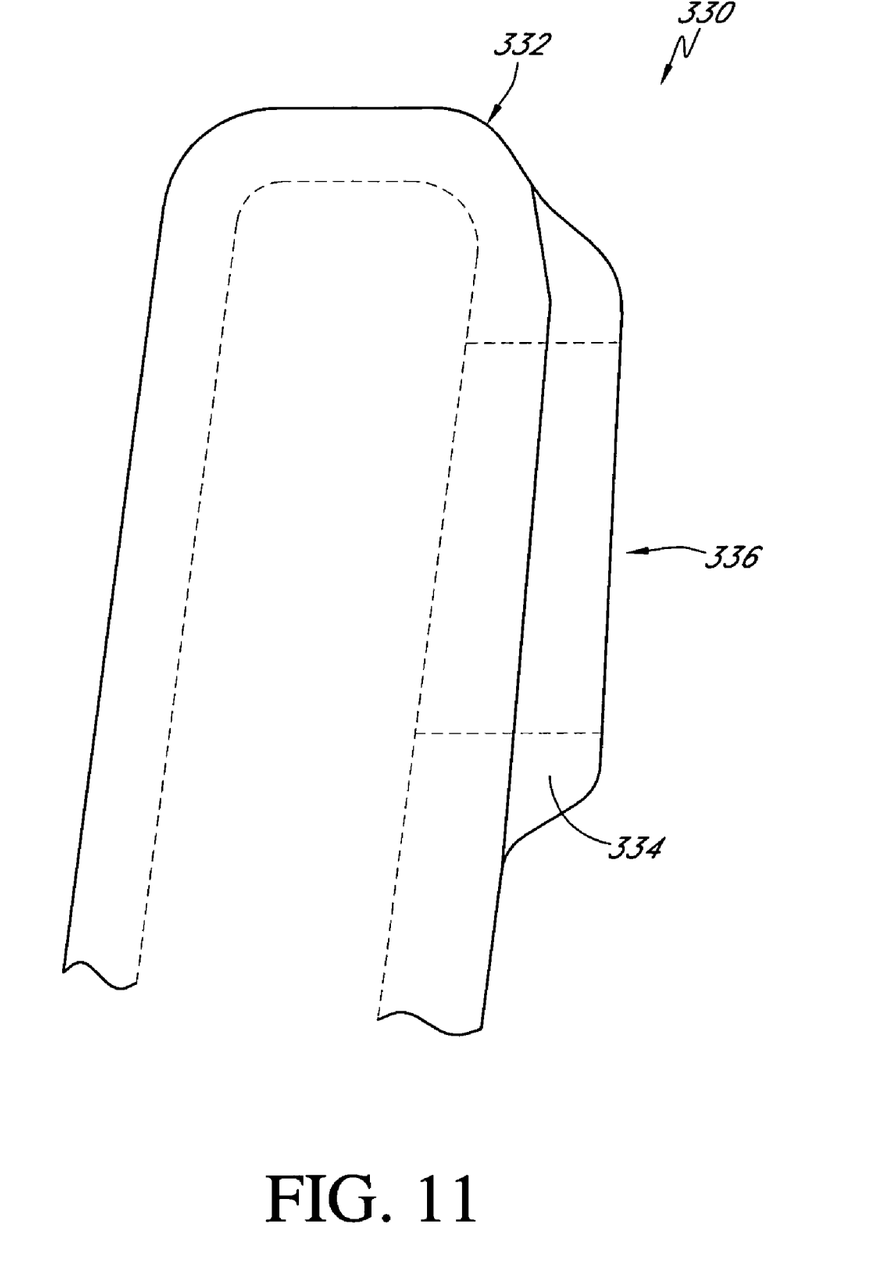
FIG. 11 illustrates one method of forming the mound of FIG. 10.
Figure 12:
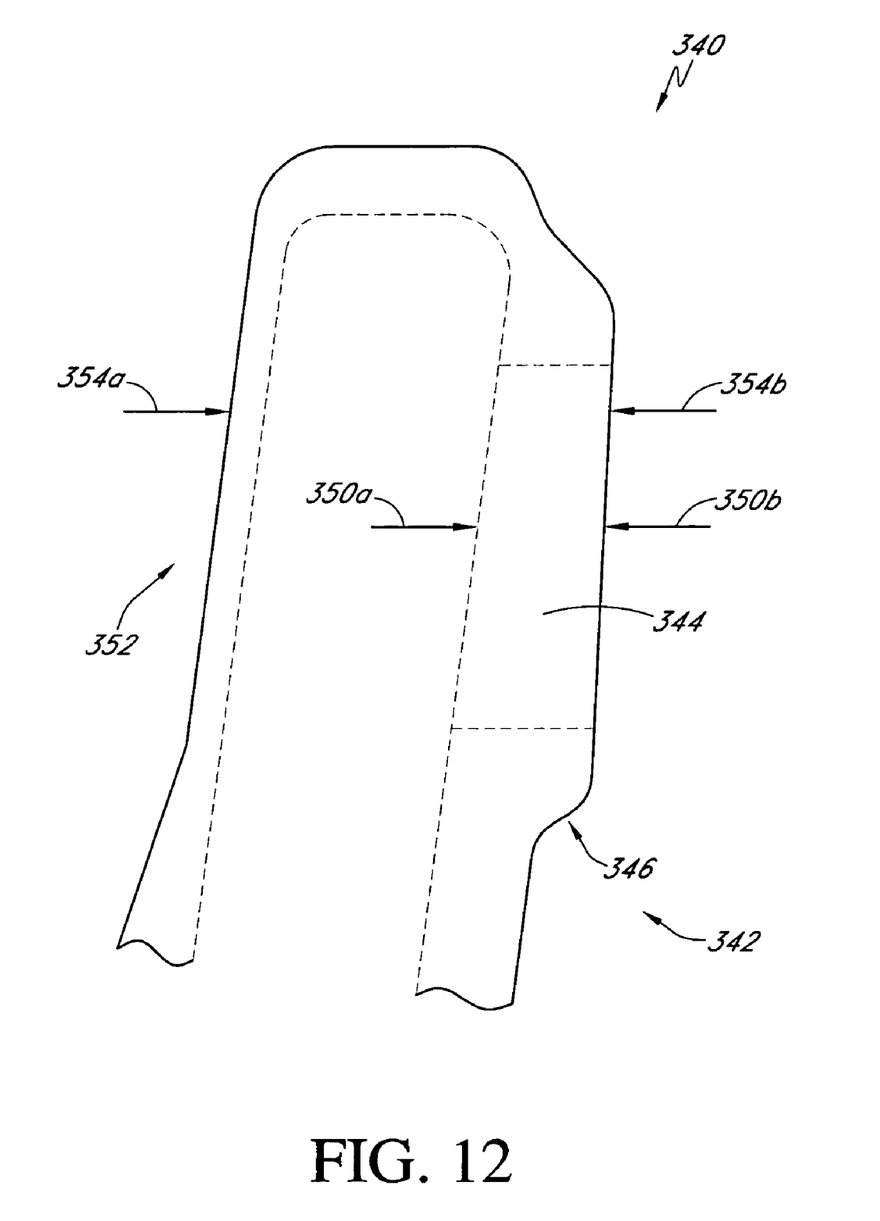
FIG. 12 illustrates one embodiment of the bun having its profile contoured to provide sufficient opening depth while generally maintaining its overall thickness thereby allowing existing seat covers to fit.

FIGS. 10–12 now illustrate another aspect of the present teachings where a seat bun is contoured in a selected manner to provide sufficient depth of an opening at its rear portion. In certain applications, a component mounted in the opening has a first thickness. Preferably, the depth of the opening is greater than or similar to the first thickness such that the mounted component has a flush fit with the contour of the rear portion of the bun. As an example, video screens and their associated mounting components are preferably flush mounted in the bun so as to not have protruding edges and corners.

FIG. 10 illustrates one embodiment of a bun 310 having an opening 314 defined by its rear portion 312. A contoured area 316 about the opening 314 provides an added depth (between arrows 320a, b) of the opening 314 so as to facilitate the flush mounting of components therein. In one embodiment, the contoured area 316 comprises a shaped mound about the opening 314.

In one embodiment, the opening 314 and the mound 316 are formed as integrally during a molding process described above. In another embodiment, the mound 316 is formed on an existing bun. FIG. 11 illustrates such a process, where a reshaped bun 330 is formed by building up a mound 334 on an existing bun 332. An opening 336 may be formed after such reshaping. Alternatively, the opening on the existing bun 332 may be formed by a mold as described above, or be cut out during an aftermarket component installation. Similarly, the mound 334 with a matching opening may be formed by a mold, or be cut out during installation. In one embodiment, the mound 316 and the existing bun 332 are formed from foam, and are attached by an adhesive.

FIG. 12 illustrates another embodiment of a bun 340 having its profile contoured about an opening 344 to allow sufficient depth (between arrows 350a, b). As described above in reference to FIGS. 10 and 11, a mound 346 may be formed on the rear portion 342 of the bun 340 about the opening 344. To maintain an overall thickness (between arrows 354a, b) of the bun 340, the front portion of the bun 340 generally opposite from the mound 346 may have material removed so as to form a recessed front surface 352. In certain applications, such recontouring to maintain the overall bun thickness may allow existing seat covers to fit over the portion of the bun 340 about the opening 344.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A preformed foam bun for an automobile high-back seat, comprising:
    a front portion that provides cushion and shape of the front portion of the high-back seat;
    a rear portion joined to the front portion so as to define an interior space for receiving an internal frame of the high-back seat;
    wherein the rear portion defines an opening dimensioned to receive a utility or an entertainment component therein and;
    a raised mound portion extending approximately rearward from the rear portion about the opening such that the mound increases the depth of the opening.

2. The foam bun of claim 1, wherein the increased depth allows flush mounting of the utility or the entertainment component with respect to the mound.

3. The foam bun of claim 2, wherein the front portion of the foam bun is dimensioned with respect to the mound so as to generally maintain a selected thickness of the foam bun about the opening.

4. The foam bun of claim 1, further comprising a wire pathway defined by the foam bun such that the pathway allows one or more wires to be routed from a first location adjacent the opening to a second location on the foam bun thereby allowing the foam bun to be prewired for easier wiring of the utility or the entertainment component installed in the opening.

5. The foam bun of claim 1, wherein the foam bun is formed from urethane.

6. The foam bun of claim 5, wherein the opening is formed during molding of the foam bun.

7. The foam bun of claim 1, wherein the utility component comprises a storage compartment.

8. The foam bun of claim 7, wherein the storage compartment includes a cover.

9. The foam bun of claim 1, wherein the entertainment component includes a video screen.

10. The foam bun of claim 9, wherein the entertainment compartment includes a cover to hide the video screen from view when the video screen is not in use.

11. A high-back seat for an automobile, comprising:
    an internal frame that provides structural integrity of the seat;
    a seat cover that covers the seat; and
    a preformed bun interposed between the internal frame and the seat cover, wherein the bun defines an integral opening at its rear portion such that the opening allows installation of a utility or an entertainment component therein;
    wherein the bun further comprises a raised mound portion extending approximately rearward from the rear portion of the bun about the opening to provide sufficient depth for flush mounting of the utility or entertainment component.

12. The seat of claim 11, wherein the contouring of the bun further comprises a front portion of the bun joined to the rear portion, wherein at least a portion of the front portion generally opposite from the mound has a thickness dimension which is reduced about the opening to generally maintain a selected thickness of the bun about the opening.

13. The seat of claim 11, wherein the bun further defines a wire pathway that allows one or more wires to be routed from a first location adjacent the opening to a second location on the bun thereby allowing the bun to be prewired for easier wiring of the utility or the entertainment component installed in the opening.

14. The seat of claim 11, wherein the bun is formed from urethane foam.

15. The seat of claim 14, wherein the opening is formed during molding of the foam bun.

16. The seat of claim 11, wherein the utility component comprises a storage compartment.

17. The seat of claim 16, wherein the storage compartment includes a cover.

18. The seat of claim 11, wherein the entertainment component includes a video screen.

19. The seat of claim 18, wherein the entertainment compartment includes a cover to hide the video screen from view when the video screen is not in use.

20. A foam bun for an automobile high-back seat, comprising:
  a front portion that provides cushion and shape of the front portion of the high-back seat;
  a rear portion joined to the front portion so as to define an interior space for receiving an internal frame of the high-back seat;
  an opening defined by the rear portion of the seat wherein the opening allows installation of a utility or an entertainment component therein; and
  a raised mound portion extending approximately rearward from the rear portion, formed about the opening to increase the depth of the opening.

21. A preformed foam bun for an automobile high-back seat, comprising:
  a front portion that provides cushion and shape of the front portion of the high-back seat;
  a rear portion joined to the front portion so as to define an interior space for receiving an internal frame of the high-back seat;
  an opening defined by the rear portion of the seat wherein the opening allows installation of a utility or an entertainment component therein;
  a raised mound portion extending approximately rearward from the rear portion, formed about the opening to increase the depth of the opening; and
  a wire pathway defined by the foam bun such that the pathway allows one or more wires to be routed from a first location adjacent the opening to a second location on the foam bun thereby allowing the foam bun to be prewired for easier wiring of the utility or the entertainment component installed in the opening.

22. A high-back seat for an automobile, comprising:
  an internal frame that provides structural integrity of the seat;
  a seat cover that covers the seat; and
  a preformed bun interposed between the internal frame and the seat cover, wherein the bun defines an integral opening at its rear portion such that the opening allows installation of a utility or an entertainment component therein;
  wherein the bun further comprises a raised mound portion extending approximately rearward from the rear portion of the bun about the opening;
  and wherein the bun further comprises a front portion joined to the rear portion, wherein at least a portion of the front portion generally opposite from the mound has a thickness dimension which is reduced about the opening to generally maintain a selected thickness of the bun about the opening for flush mounting of the utility or entertainment component.

23. The seat of claim 22, wherein the bun further defines a wire pathway that allows one or more wires to be routed from a first location adjacent the opening to a second location on the bun thereby allowing the bun to be prewired for easier wiring of the utility or the entertainment component installed in the opening.

24. The seat of claim 22, wherein the opening is formed during molding of the foam bun.

25. The seat of claim 22, wherein the utility component comprises a storage compartment.

26. The seat of claim 25, wherein the storage compartment includes a cover.

27. The seat of claim 22, wherein the entertainment component includes a video screen.

28. The seat of claim 27, wherein the entertainment compartment includes a cover to hide the video screen from view when the video screen is not in use.

* * * * *

UNITED STATES PATENT AND TRADEMARK OFFICE
CERTIFICATE OF CORRECTION

| | | |
|---|---|---|
| PATENT NO. | : 7,188,895 B1 | Page 1 of 1 |
| APPLICATION NO. | : 10/765464 | |
| DATED | : March 13, 2007 | |
| INVENTOR(S) | : Espina et al. | |

It is certified that error appears in the above-identified patent and that said Letters Patent is hereby corrected as shown below:

On Title Page, Item (56) (U.S. Patent Documents), please delete "6/1989" and insert -- 3/1987 --, therefor.

On Title Page, Item (56) (U.S. Patent Documents), please delete "Hashimoto" and insert -- Chang, Chung L. --, therefor.

At column 5, line 9, please delete "seat," and insert -- seat --, therefor.

At column 8, line 65, in Claim 12, after "wherein" please delete "the contouring of", therefor.

Signed and Sealed this

Twenty-fourth Day of July, 2007

JON W. DUDAS
*Director of the United States Patent and Trademark Office*